INVENTOR.
KENNETH H. RUSSELL
BY Morse & Altman
ATTORNEYS

INVENTOR.
KENNETH H. RUSSELL
BY
ATTORNEYS

United States Patent Office 3,306,440
Patented Feb. 28, 1967

3,306,440
WINNOWING MACHINE FOR BLUEBERRIES
Kenneth H. Russell, 62 Princess St., St. Stephen,
New Brunswick, Canada
Filed Aug. 23, 1963, Ser. No. 304,102
1 Claim. (Cl. 209—27)

Figure 1:
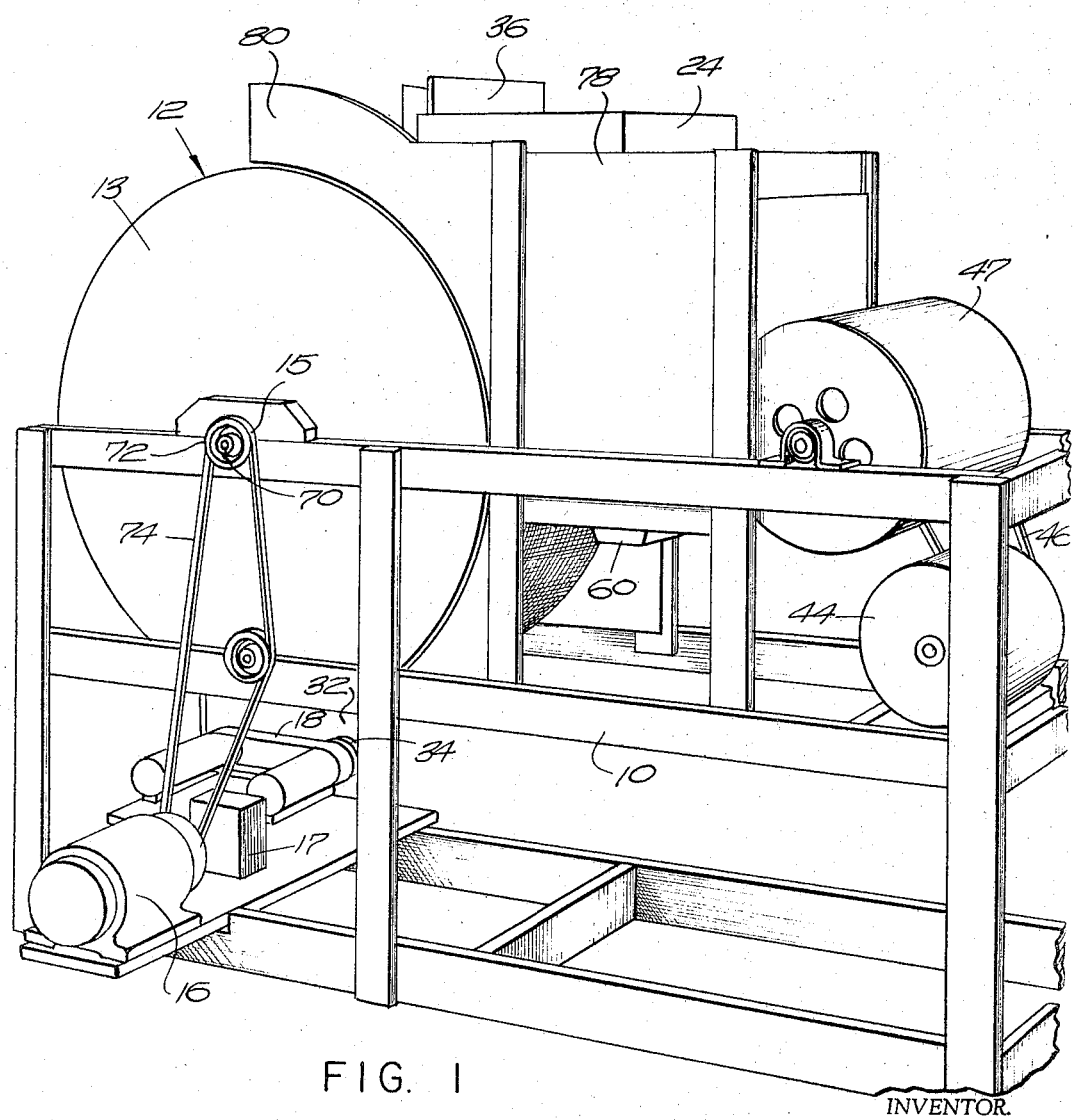
Figure 2:
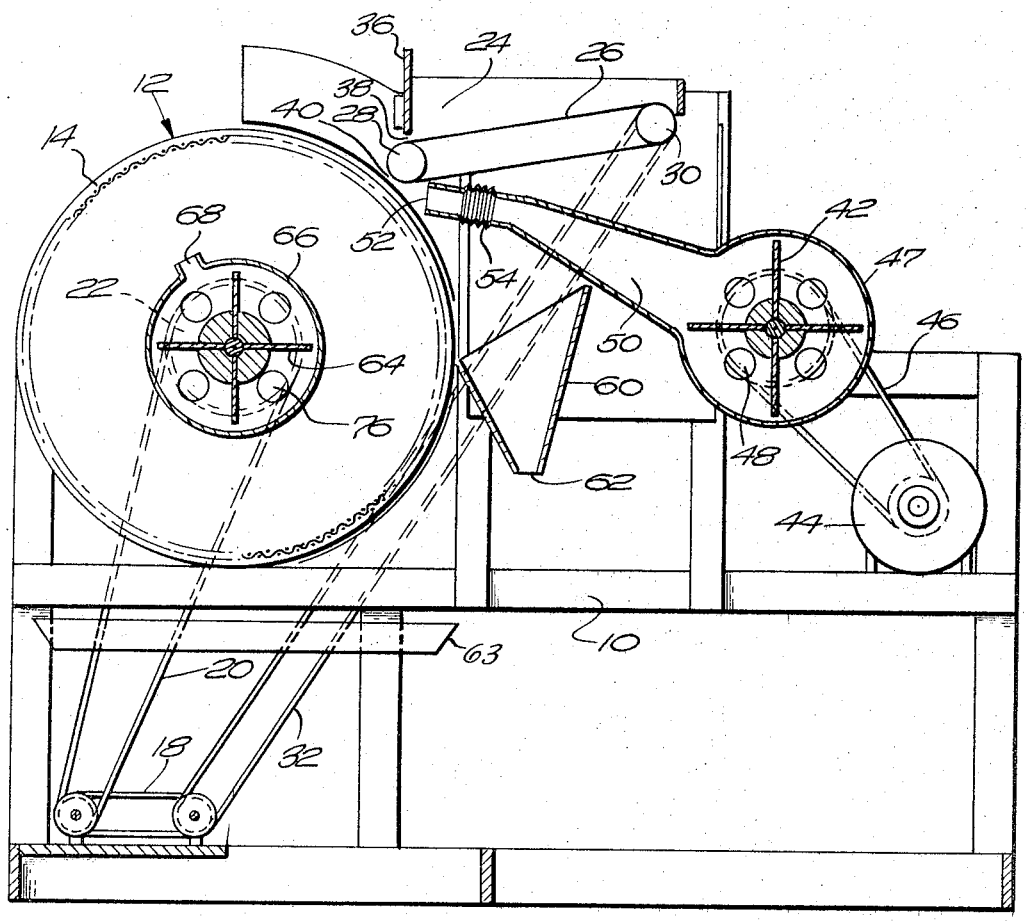

This invention relates to a machine for winnowing and grading blueberries to prepare them for the market. Blueberries are customarily gathered by means of hand "rakes" which are scoops having as a bottom or floor a series of long, closely spaced teeth by which the berries are stripped from the bushes. This practice inevitably results in the accumulation of more or less trash with the berries, the trash consisting of such things as leaves, twigs, clusters, wild berries and unripe blueberries. For a marketable product, the berries must be separated from the trash, preferably without being touched by human hands, and undersized berries should be eliminated. According to the invention, a machine is provided for winnowing blueberries quickly and efficiently by a strong air blast in conjunction with suitable conveying means. For a more complete understanding of the invention, reference may be had to the following description thereof, and to the drawings, of which FIGURE 1 is a perspective view of a machine embodying the invention; and FIGURE 2 is a sectional view of the machine, showing the working parts.

Mounted on the main frame 10 for rotation about a horizontal axis is a drum 12 having circular heads 13 and a cylindrical wall 14 which is foramious and preferably consists of a wire screen having a mesh selected according to the desired minimum size of the berries to be accepted. In the machine illustrated the drum has a diameter of 36 inches and a width of about 21 inches, but these dimensions may be varied. The drum 12 is rotated counter-clockwise at a speed of from 12 to 20 revolutions per minute, the speed for any particular batch of berries being regulated according to the condition of the berries and the minimum size to be recovered. The drum is driven by any suitable means such as an electric motor 16 which is connected through a speed-reducing gear-box 17 to a variable speed device 18 which in turn is connected by a belt 20 to a pulley wheel 22 mounted on the drum 12 and coaxial therewith.

Mounted above the rising side of the drum 12 is a feeder hopper 24, the bottom of which is a conveyor belt 26 running between two rolls 28, 30, the roll 30 being connected by a belt 32 to a pulley wheel 34 which is driven by the motor 16 through the speed-reducing gear 17. The conveyor belt 26 is of any flexible material of sufficient strength, such as rubber or canvas, the surface being glazed so as to present a smooth face to the berries.

One wall 36 of the feeder hopper 24 is directly over the delivery end of the conveyor 26 and is vertically adjustable to vary the clearance 38 of its bottom edge from the surface of the conveyor. This clearance is usually ½ to ¾ of an inch so that the berries are discharged from the feeder hopper in a thin stream as wide as the drum 12.

To winnow the berries as they fall off the end of the conveyor 26, a strong blast of air is directed to the clearance 40 between the conveyor 26 and the wire net circumferential wall of the drum 12. This clearance is adjustable from about 1½ inches to 2½ inches. The air stream is supplied by a fan 42 driven by a variable speed electric motor 44 through a belt 46. The fan illustrated is a paddle fan in a cylindrical casing 47 with inlet openings 48 and a discharge duct 50 which tapers to an oblong discharge orifice 52 which is about three inches high and about as wide as the drum 12. As shown, the discharge duct is arranged to direct the air stream against the cylindrical wall 14 of the drum in a direction which is nearly tangent to the drum at the point where the berries are deposited thereon. The terminal portion 54 of the duct 50 is slightly flexible so that the position and direction of the air stream from the orifice 52 can be varied to a limited degree.

A receiving hopper 60 is mounted next to the drum 12 and directly below part of the air duct 50. When the machine is in operation, berries are carried by the conveyor through the clearance 38 to drop onto the revolving drum 12. The sound berries which are too large to go through the drum wall fall by gravity into the receiving hopper 60, the hopper being provided with a gate 62 which can be opened to let the recovered berries fall into receptacles (not shown) which may be placed below the hopper. The stream of air flowing from the orifice 52 holds back the trash which is carried by the motion of the cylindrical screen wall of the drum over the top thereof and into a suitable receptacle (not shown), the under-sized berries falling through the meshes of the screen to be collected below the drum in a receptacle 63 and discarded.

To dislodge leaves, twigs or the like which may tend to catch in the meshes of the screen, a fan 64 is mounted in a non-rotatable casing 66 within the drum to discharge a stream of air through a vent 68 in the casing to flow radially outward through the screen wall 14 at a descending part thereof. This fan has a shaft 70 an end of which carries a pulley wheel 72 connected by a belt 74 to the motor 16 for relatively fast rotation of the fan 64, inlet holes 76 being provided in an end wall of the drum 12.

To help direct and confine the air stream from the orifice 52, side panels 78 are mounted on the frame, these panels extending forward to the top of the drum 12, as at 80.

I claim:

A winnowing machine for blueberries, comprising a frame, a cylindrical drum mounted on said frame to rotate about a horizontal axis, the cylindrical wall of said drum being of woven wire screen with a mesh slightly smaller than the diameter of the berries to be recovered, means for revolving said drum, a conveyor belt with a smooth surface arranged to discharge berries on said cylindrical wall of said drum at a point where the rising side of the screen is nearing the top, the delivery end of said conveyor being spaced from said drum, adjustable means near the delivery end of the conveyor for limiting the depth of the stream of berries delivered to the drum, means below said conveyor for directing a stream of air toward the space between the conveyor and drum and in a direction approximately tangent to the cylindrical wall of the drum, the last named means including a fan, a variable speed motor driving said fan, and a duct receiving air from the fan, said duct being adjustable to vary the direction of said stream, a feeder hopper for supplying berries to said conveyor, a discharge hopper beneath said duct and next to said drum to receive berries from the surface of said drum, a receptacle beneath the drum to receive under-sized berries falling through the meshes of the drum, and means for directing a stream of air outward through said screen at a descending point therof.

References Cited by the Examiner
UNITED STATES PATENTS 2,114,727   4/1938   Thys _____ 209—45 X
2,228,977   1/1941   Rogers _____ 209—35 X
2,762,506   9/1956   Fine _____ 209—27

FOREIGN PATENTS 233,597   5/1925   Great Britain.

FRANK W. LUTTER, *Primary Examiner.*